US010050914B2

(12) United States Patent
Li (10) Patent No.: US 10,050,914 B2
(45) Date of Patent: Aug. 14, 2018

(54) METHOD AND DEVICE FOR PARSING MMS INFORMATION (75) Inventor: Xin Li, Shandong (CN)

(73) Assignee: Hisense Mobile Communications Technology Co., Ltd. (CN)

( * ) Notice: Subject to any disclaimer, the term of this patent is extended or adjusted under 35 U.S.C. 154(b) by 425 days.

(21) Appl. No.: 14/111,360

(22) PCT Filed: Apr. 1, 2012

(86) PCT No.: PCT/CN2012/073464
§ 371 (c)(1),
(2), (4) Date: Oct. 11, 2013

(87) PCT Pub. No.: WO2012/139471
PCT Pub. Date: Oct. 18, 2012

(65) Prior Publication Data
US 2014/0040407 A1  Feb. 6, 2014

(30) Foreign Application Priority Data

Apr. 13, 2011 (CN) .......................... 2011 1 0092409

(51) Int. Cl.
G06F 15/16 (2006.01)
H04L 12/58 (2006.01)
G06F 17/27 (2006.01)

(52) U.S. Cl.
CPC .......... H04L 51/10 (2013.01); G06F 17/2705 (2013.01)

(58) Field of Classification Search
CPC ................ H04W 12/04; G06F 17/2705; G06F 17/3033; G06F 17/30097; H04L 2209/60;
(Continued)

(56) References Cited

U.S. PATENT DOCUMENTS 6,157,958 A * 12/2000 Armitage .............. G06F 1/1626
709/250
2006/0271539 A1* 11/2006 Loeb .................... G06F 17/3033
(Continued)

FOREIGN PATENT DOCUMENTS

CN 101494832 A 7/2009
CN 101765073 A 6/2010
(Continued)

OTHER PUBLICATIONS

Indian Office Action dated Jun. 22, 2018, of corresponding Indian Application No. 9045/CHENP/2013 in English.

*Primary Examiner* — Anthony Mejia
*Assistant Examiner* — Kristoffer L S Sayoc
(74) *Attorney, Agent, or Firm* — DLA Piper LLP (US)

(57) ABSTRACT

Disclosed are a method and device for parsing MMS information. The method includes: determining the storage location information corresponding to a first keyword of the received MMS information; determining keyword information in the storage location corresponding to the storage location information; when the first keyword is identical to a second keyword in the determined keyword information, taking the keyword attribute of the keyword information as the keyword attribute corresponding to the first keyword; and parsing the MMS according to the keyword attribute corresponding to the first keyword. There is no need to conduct a large amount of comparisons when determining the keyword attribute corresponding to the keyword in MMS information according to the correlation between the storage location information and the keyword information, thus the parsing speed and response speed are increased, and the parsing efficiency improved.

14 Claims, 4 Drawing Sheets (58) Field of Classification Search
CPC ... H04L 63/062; H04L 63/06; H04L 63/0428; H04L 51/10
USPC .......................... 709/206; 707/698; 711/154
See application file for complete search history.

(56) References Cited

U.S. PATENT DOCUMENTS

| | | | |
|---|---|---|---|
| 2007/0294506 A1* | 12/2007 | Ross | G06F 12/0897 711/216 |
| 2008/0052284 A1 | 2/2008 | Stokes | |
| 2009/0274154 A1* | 11/2009 | Kopelman | H04L 45/00 370/395.32 |
| 2011/0131221 A1* | 6/2011 | Bhide | G06F 17/30663 707/755 |
| 2012/0157133 A1* | 6/2012 | Cao | H04W 4/12 455/466 |

FOREIGN PATENT DOCUMENTS

| | | |
|---|---|---|
| CN | 101853253 A | 10/2010 |
| CN | 102164353 A | 8/2011 |
| JP | 4358511 | 8/2009 |

\* cited by examiner

METHOD AND DEVICE FOR PARSING MMS INFORMATION

This application is a US National Stage of International Application No. PCT/CN2012/073464, filed on 1 Apr. 2012, designating the United States, and claiming priority from Chinese Patent Application No. 201110092409.7, filed with the Chinese Patent Office on Apr. 13, 2011 and entitled "Method and device for parsing MMS information", which is hereby incorporated by reference in its entirety.

FIELD OF THE INVENTION

The present invention relates to the field of wireless communication technologies and particularly to a method and device for parsing MMS information.

BACKGROUND OF THE INVENTION

A Multimedia Message Service (MMS) can transmit and receive, like a short message, a more personalized multimedia message, e.g., a text, a graphic, an image, an audio, a video, animation, music and other information contents, without any influence on normal communication of a mobile phone. The MMS is consisted of a series of slices (like a slide show) by which text, audio and video information in various formats is organized for display.

In the MMS, such multimedia information is organized together in the SMIL language and transmitted over a network, and can be sure to be played at a recipient in a style at a sender in the SMIL language.

The MMS makes use of a subset of the Synchronized Multimedia Integration Language (SMIL) as a description language, and the SMIL is a description standard established by the World Wide Web Consortium (W3C) based upon the eXtensible Markup Language (XML). The SMIL language can control the layout and play timing of a multimedia object. Each piece of MMS information is consisted of a file in the SMIL description language, and all the slides in the file have the same layout. Each slide includes at least two regions, one of which includes texts and the other of which includes images. Indeed, each slide is a frame including a layout and an index to contents (a text, an image, an audio and a video). The play period of each slide is in seconds, and play times of a text and an image can be set separately in each slide.

The receiver has to parse the MMS information upon reception thereof. The parsing of the MMS refers to a process in which an MMS data packet is parsed for an SMIL document upon reception of the MMS data packet over the network, and attached media (texts, pictures, voice, videos, etc.) are extracted according to a description of the SMIL document and encapsulated into a construct that can be recognized and played at a terminal.

Comparisons of character strings are required when the SMIL document is parsed for setting values of a keyword and a character string type. An existing implementation method is to compare each character string extracted from the SMIL document with keywords specified in the SMIL to find out a corresponding keyword and keyword attribute. This parsing method by comparison is algorithmically simple but involves a large number of comparisons and thus has low efficiency.

In summary, the MMS information is currently parsed in the SMIL, to thereby result in a slow parsing speed, a slow response speed and relatively low parsing efficiency.

SUMMARY OF THE INVENTION

Embodiments of the invention provide a method and device for parsing MMS information so as to address the problem in the prior art of parsing MMS information at a slow parsing speed and a slow response speed with relatively low parsing efficiency.

An embodiment of the invention provides a method for parsing MMS information, which includes:
determining storage location information corresponding to a first keyword in received MMS information;
determining keyword information in a storage location corresponding to the storage location information;
taking a keyword attribute in the keyword information as a keyword attribute corresponding to the first keyword when the first keyword is identical to a second keyword in the determined keyword information; and
parsing the MMS information according to the keyword attribute corresponding to the first keyword.

An embodiment of the invention provides a device for parsing MMS information, which includes:
a location information determining module configured to determine storage location information corresponding to a first keyword in received MMS information;
a keyword information determining module configured to determine keyword information in a storage location corresponding to the storage location information;
an attribute determining module configured to take a keyword attribute in the keyword information as a keyword attribute corresponding to the first keyword when the first keyword is identical to a second keyword in the determined keyword information; and
a parsing module configured to parse the MMS information according to the keyword attribute corresponding to the first keyword.

Since the keyword attribute corresponding to the keyword in the MMS information is determined according to the correspondence relationship between the storage location information and the keyword information, there is no need to conduct a large number of comparisons to thereby increase the parsing speed and the response speed as well as the parsing efficiency.

DETAILED DESCRIPTION OF THE EMBODIMENTS

In embodiments of the invention, a determined correspondence relationship f is established between the location where a character string is stored and its keyword information so that each piece of keyword information has a unique storage location in the construct. For a search, simply an image f(K) of a given value K is found according to the correspondence relationship f. If there is a record which has a keyword equal to K in the construct, then the record must be at the storage location of f(K), so the record searched for can be obtained directly without any comparison.

Specifically in the embodiments of the invention, a correspondence relationship between storage location information and keyword information is predetermined, that is, the keyword information is stored into storage locations corresponding to the storage location information; and then keyword information is determined at a storage location of storage location information corresponding to a first keyword in received MMS information, and if the first keyword is identical to a second keyword in the determined keyword information, then it can be determined that a keyword attribute in the keyword information is a keyword attribute of the first keyword, and then the MMS information can be parsed according to each keyword attribute. Since the keyword attribute corresponding to the keyword in the MMS information is determined according to the correspondence relationship between the storage location information and the keyword information, there is no need to conduct a large number of comparisons to thereby increase the parsing speed and the response speed as well as the parsing efficiency.

The embodiments of the invention will be further described in details below with reference to the drawings.

Figure 1:
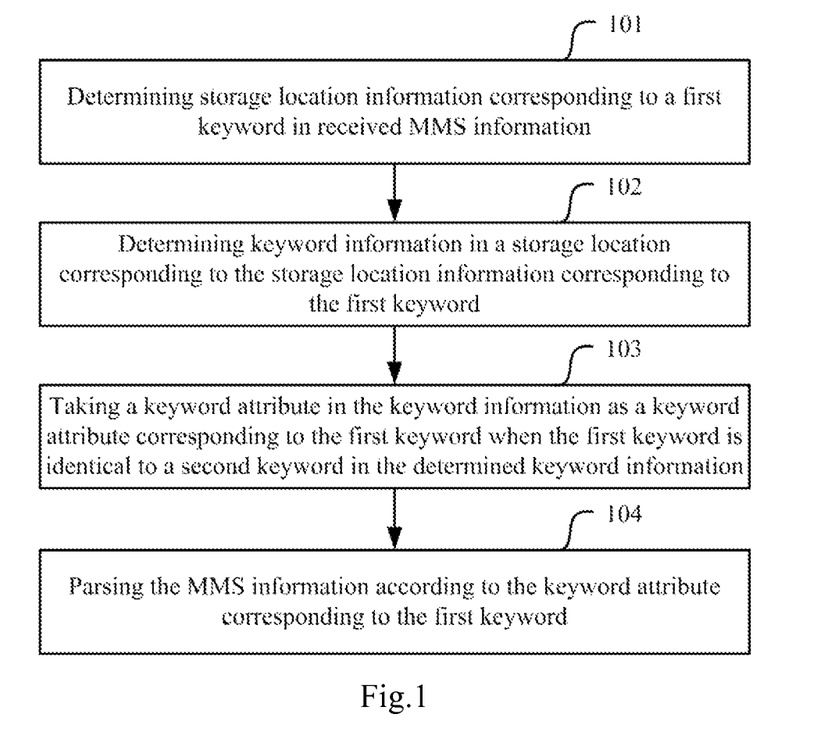
FIG. 1 is a schematic flow chart of a method for parsing MMS information according to an embodiment of the invention.

As illustrated in FIG. 1, a method for parsing MMS information according to an embodiment of the invention includes the following steps:

Step 101, determining storage location information corresponding to a first keyword in received MMS information.

Step 102, determining keyword information in a storage location corresponding to the storage location information corresponding to the first keyword.

Step 103, taking a keyword attribute in the keyword information as a keyword attribute corresponding to the first keyword when the first keyword is identical to a second keyword in the determined keyword information.

Step 104, parsing the MMS information according to the keyword attribute corresponding to the first keyword.

Preferably, the keyword information can be stored in the form of a hash table.

Preferably, keyword information is further stored into corresponding storage locations before the step 101.

Specifically, storage location information corresponding to the keyword information is determined and the keyword information is stored into storage locations corresponding to the storage location information before the step 101.

Particularly, the storage location information corresponding to the keyword information can be determined in numerous approaches, several of which will be listed below:

In a first approach, after a piece of storage location information is determined, it is checked whether it collides with already allocated storage location information.

Specifically the following steps are included:

Step A1, determining, for a piece of keyword information, a hash value corresponding to a second keyword in the keyword information;

Step A2, determining corresponding storage location information according to the hash value; and Step A3, judging whether the determined storage location information is identical to already determined storage location information of other keyword information, and if so, then determining a piece of new storage location information and returning to the step of judging whether the determined storage location information is identical to already determined storage location information of other keyword information; otherwise, taking the determined storage location information as storage location information corresponding to the keyword information.

In the step A1, the hash value corresponding to the second keyword in the keyword information can be determined in numerous methods. A good hash function is as follows: any keyword in a keyword set is mapped by the hash function to any address in an address set at an approximately equal probability, so this hash function is a uniform hash function. That is, a keyword is mapped by the good hash function to a "random address" so that hash addresses of a set of keywords are distributed uniformly throughout the address interval to thereby alleviate confliction.

Based upon this, in the embodiment of the invention, the hash value corresponding to the second keyword in the keyword information can be determined by performing bit shifting operations on ASCII values of letters.

A detailed description will be given below.

1. Assumed C1, C2, C3 and C4 each represents an ASCII value of a letter, and the four ASCII values constitute a 32-bit integer numerical value.

For example, a keyword "smil" can be converted into a numerical value as depicted in Table 1:

TABLE 1

| C1 | C2 | C3 | C4 |
|---|---|---|---|
| s | m | i | l |
| 0x73 | 0x6D | 0x69 | 0x6C |

A hash value corresponding to "smil" is derived to be 0x736D696C according to Table 1.

2. For a character string of less than four digits, bits are padded starting from the location C1, and zeros are supplemented at the last location.

For example, a keyword "par" can be converted into a numerical value as depicted in Table 2:

TABLE 2

| C1 | C2 | C3 | C4 |
|---|---|---|---|
| P | a | r | NULL |
| 0x70 | 0x61 | 0x72 | 0x00 |

A hash value corresponding to "par" is derived to be 0x70617200 according to Table 2.

3. For a character string of more than four digits, bits are padded starting from the location C1, and for the digits following the fourth digit, bits are further padded starting from the location C1 and perform an XOR operation with the original value of C1 to obtain a new value of C1, and the rest can be done in the same manner.

For example, a keyword "layout" can be converted into a numerical value as depicted in Table 3:

TABLE 3

| C1 | C2 | C3 | C4 |
|---|---|---|---|
| L | a | y | o |
| 0x6C | 0x61 | 0x79 | 0x6F |
| U | t | NULL | NULL |
| 0x75 | 0x74 | | |
| 0x19 | 0x15 | 0x79 | 0x6F |

A hash value corresponding to "layout" is derived to be 0x1915796F according to Table 3.

If the keyword information is stored in the form of a hash table, then preferably in the step A2, the storage location information can be determined in Formula 1 below:

Storage location information=$h$% hash_table_size      Formula 1

Where h represents the hash value calculated corresponding to the second keyword, and hash_table_size represents the table length of the hash table.

In addition to the hash value, ASCII values of letters in each keyword can be summed and then multiplied by the number of letters as h. Thus it can be ensured as much as possible that the obtained locations appear uniformly in the hash table.

Since in the first approach, after a piece of storage location information is determined, it is checked whether the piece of storage location information collides with already allocated storage location information, it will be judged in the step A3 whether the determined storage location information is identical to already determined storage location information of other keyword information, and if so, then a piece of storage location information is determined newly and judgment is made again until the newly determined storage location information is not occupied by other keyword information; otherwise, the determined storage location information is taken as storage location information corresponding to the keyword information.

Two different keywords are mapped onto the same location of the table due to their identical hash function values. This phenomenon is referred to as collision or conflict. The two keywords with collision occurring are referred to as synonyms of the hash function.

Collision is substantially inevitable unless there is little data, so the only way is to take measures to avoid collision as much as possible or to seek a method for solving collision. Among factors influencing collision, the frequency of collision is related to the extent that the table is filled in addition to the hash function.

In the embodiments of the invention, there are numerous methods for solving collision, e.g., open addressing, quadratic probing, double hashing, chaining and the like. Since the MMS information generally includes no more than 200 keywords, a step value method can be adopted preferably.

Specifically storage location information can be determined newly by adding a step value to the same storage location information to obtain new storage location information.

The step value here can be set as needed, for example, the step value can be changed regularly according to the number of uses, or the step value can be set to 1.

Preferably each second keyword can correspond respectively to a different step value. For example, the step value corresponding to the second keyword can be determined in Formula 2 below:

Step=1+($h$ % (hash_table_size−2))      Formula 2

Where Step represents the step value, h represents the hash value calculated corresponding to the second keyword, and hash_table_size represents the table length of the hash table.

It shall be noted that the embodiment of the invention will not be limited to the approach in which the step value is determined in Formula 2, and all of other approaches for determining the step value will be applicable to the embodiment of the invention. For example, if each second keyword corresponds respectively to a different step value, then each keyword can have a step value which is set as needed; or accumulations can be made starting from a fixed value in an order of second keywords, and a result of each accumulation can be taken as a step value of a second keyword.

Figure 3:
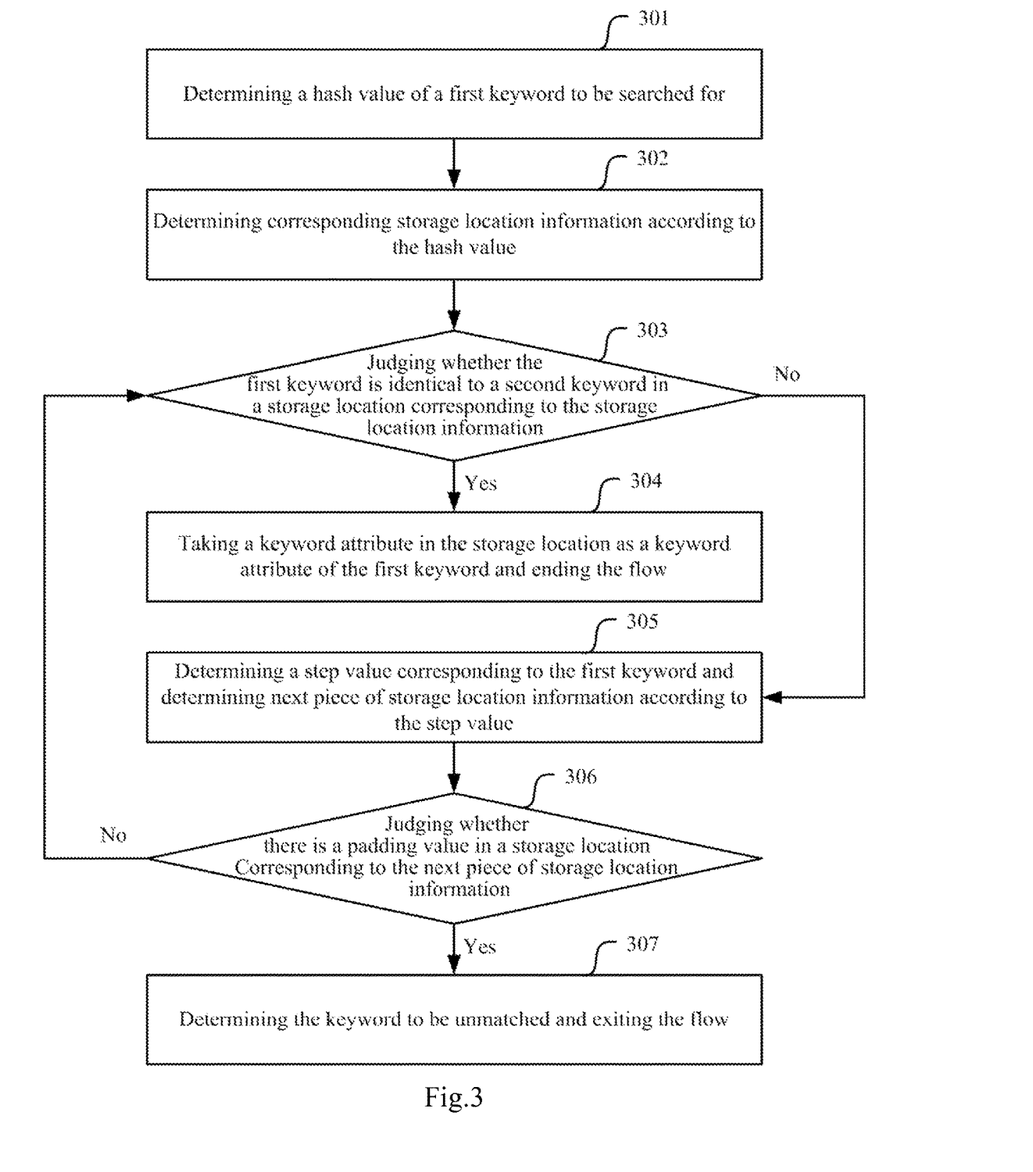
FIG. 3 is a schematic flow chart of a method for searching for a keyword attribute according to an embodiment of the invention.

For a particular process of the first approach, reference can be further made to FIG. 3.

In a second approach, after all of storage location information is determined, it is checked whether there is identical storage location information.

Specifically the following steps are included:

Step B1, determining hash values corresponding to second keywords in all of the keyword information;

Step B2, determining corresponding storage location information according to each hash value respectively; and Step B3, judging whether there is identical storage location information among all of the storage location information, and if so, then determining keyword information corresponding to each piece of storage location information among the identical storage location information, reserving the storage location information corresponding to one piece of keyword information, determining newly storage location information corresponding respectively to each piece of remaining keyword information, and returning to the step of judging whether there is identical storage location information among all of the storage location information; otherwise, taking the determined storage location information as storage location information corresponding to the keyword information.

The hash value is determined in the step B1 in the same way that the hash value is determined in the step A1, and the storage location information is determined in the step B2 in the same way that the storage location information is determined in the step A2, so a repeated description thereof will be omitted here.

Since in the second approach, it is checked after all of the storage location information is determined whether there is identical storage location information, it will be checked in the step B3 whether there is identical storage location information among all of the storage location information, and if so, then the storage location information corresponding to one piece of the keyword information is reserved among the identical storage location information, and storage location information corresponding to the other keyword information will be newly determined respectively, and then it is further checked whether there is identical storage location information among all of the storage location information until there is no identical storage location information. For example, there is identical storage location information corresponding to keyword information A, keyword information B and keyword information C, and then it can be determined that the storage location information corresponding to the keyword information A is unchanged, and storage location information corresponding to the keyword information B and C will be determined newly until all of the storage location information corresponding to the keyword information A, the keyword information B and the keyword information C is different from each other.

There are numerous methods for solving collision here, e.g., open addressing, quadratic probing, double hashing, chaining and the like. Since the MMS information generally includes no more than 200 keywords, a step value method can be adopted preferably.

Specifically the storage location information can be determined newly by adding a corresponding step value respectively to the other storage location information to obtain new storage location information.

The step value is determined in the second approach in the same way that the step value is determined in the first approach, so a repeated description thereof will be omitted here.

If the keyword information is stored in the form of a hash table, then an array of the hash table has a fixed length, and if it is too large, then space may be wasted, and if it is too small, then no efficiency can be embodied. An appropriate size of the array is a key to the performance of the hash table. Preferably the size of the hash table is a prime number. Of course, there will be a varying size of the hash table dependent upon a different amount of data.

Table 4 is given by way of an example:

TABLE 4

| o | Keyword | Keyword attribute | Hash value | MOD 15 | MOD 23 | Solving collision ->New hash location |
|---|---------|-------------------|------------|--------|--------|---------------------------------------|
|   | "smil"  | SMIL_ELEMENT_SMIL | 0x736D696C | 2  | 1  |  |
|   | "head"  | SMIL_ELEMENT_HEAD | 0x68656164 | 12 | 14 |  |
|   | "meta"  | SMIL_ELEMENT_META | 0x6D657461 | 3  | 19 |  |
|   | "layout"| SMIL_ELEMENT_LAYOUT | 0x1915796F | 8 | 4 |  |
|   | "root-layout" | SMIL_ELEMENT_ROOT_LAYOUT | 0x30767A0D | 1 | 0 |  |
|   | "region"| SMIL_ELEMENT_REGION | 0x1D0B6769 | 8 | 8 |  |
|   | "body"  | SMIL_ELEMENT_BODY | 0x626F649 | 10 | 18 |  |
|   | "par"   | SMIL_ELEMENT_PAR | 0x70617200 | 8 | 7 |  |
|   | "text"  | SMIL_ELEMENT_TEXT | 0x74657874 | 3 | 9 |  |
|   | "img"   | SMIL_ELEMENT_IMG | 0x696D6700 | 2 | 8 | Collision -> 15 |
| 0 | "audio" | SMIL_ELEMENT_AUDIO | 0x0E756469 | 6 | 19 | Collision -> 11 |
| 1 | "ref"   | SMIL_ELEMENT_REF | 0x72656600 | 2 | 15 | Collision -> 10 |
| 2 | "video" | SMIL_ELEMENT_VIDEO | 0x19696465 | 1 | 20 |  |
| 3 | "param" | SMIL_ELEMENT_PARAM | 0x1D617261 | 7 | 19 | Collision -> 2 |
| 4 | "seq"   | SMIL_ELEMENT_SEQ | 0x73657100 | 14 | 6 |  |

In Table 4, the number of keywords is 15, and if the length of the table is 15, then among storage location information calculated in Formula 1, there are six pieces with collision occurring in the table, i.e., 15+6=21. The prime number closest to 21 is 23, so preferable HashTable is set to 23. Hereupon hash values are calculated again.

Of course, if the length of the table is the same as the number of keywords, then the correspondence relationship solution according to the embodiment of the invention can also be applied and can also have a better effect over the prior art, but there are six occurrences of collision for the locations calculated in the hash algorithm without adding secondary collision, so the search efficiency will be degraded as compared with the case that the length of the table is 23, and if the length of the table is designed to be reasonable, then it can be ensured that a keyword to be searched for is hit upon hashing once.

If the length of the table is greater than the number of keywords, then there will be unfilled locations in the hash table after all of the keyword information is filled into the hash table. Preferably a padding value is put into the locations in the hash table where no keyword information is filled after all of the keyword information is filled into the hash table. The padding value here can be set as needed, e.g., 0xff, i.e., 255.

If collision is avoided by using the step value method, then in the step 103, when the first keyword is different from a second keyword in the determined keyword information and the determined keyword information is not a padding value, a step value corresponding to the first keyword is determined; and the step value is added to the determined storage location information to obtain new storage location information, and the flow returns to the step of determining keyword information in a storage location corresponding to the storage location information; and The first keyword is determined to be unmatched when the determined keyword information is a padding value.

The step value corresponding to the first keyword is determined here in the same way that the step value is determined when solving collision.

Figure 2:
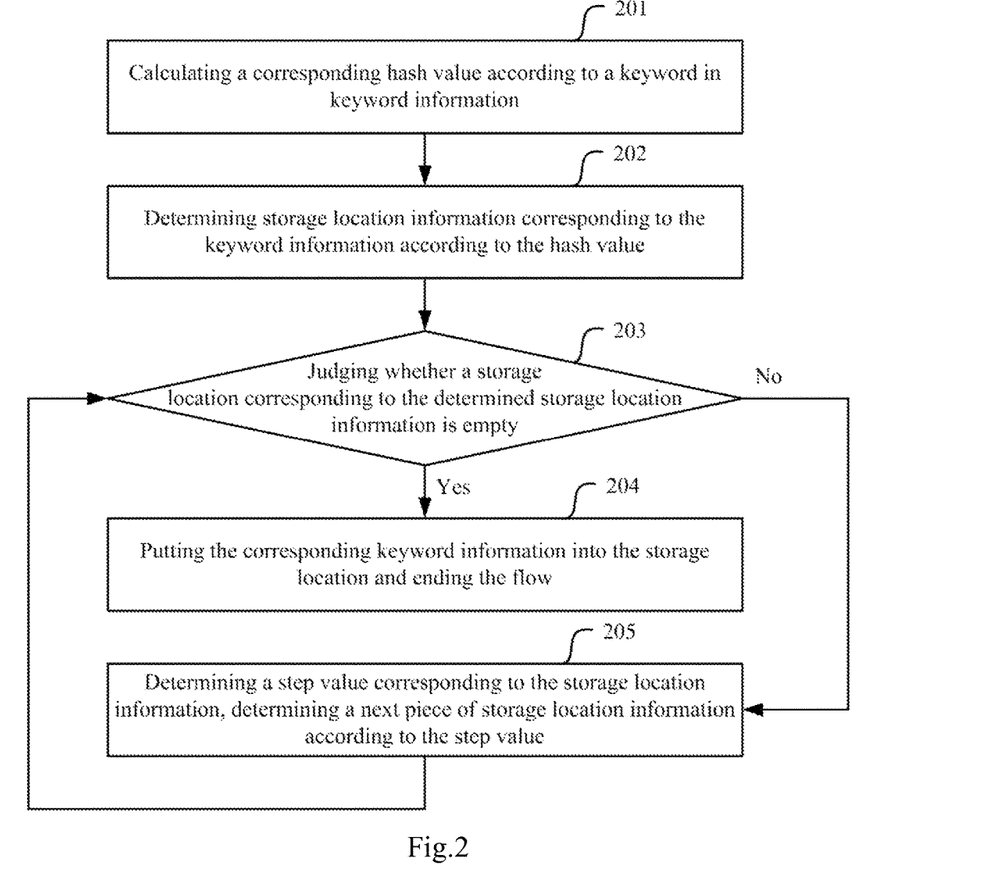
FIG. 2 is a schematic flow chart of a method for storing keyword information according to an embodiment of the invention.

As illustrated in FIG. 2, a method for storing keyword information according to an embodiment of the invention includes the following steps:

Step 201, calculating a corresponding hash value according to a keyword in keyword information.

Step 202, determining storage location information corresponding to the keyword information according to the hash value.

Step 203, judging whether a storage location corresponding to the determined storage location information is empty, and if so, performing step 204; otherwise, performing step 205.

Step 204, putting the corresponding keyword information into the storage location and ending the flow.

Step 205, determining a step value corresponding to the storage location information, determining a next piece of storage location information according to the step value and returning to the step 203.

According to the flow in FIG. 2, it can be seen that in the hash table as shown by Table 4, the location 8 calculated firstly for the keyword "img" has already have the value of "region", the step value of 15 is calculated, and the location 0 calculated by firstly adding the step value also has been occupied, and the location 15 calculated by adding the step value again is still empty, so the serial number "9" of "img" is put into the location 15 in the hash table. Other collision can be solved like "img", and a repeated description thereof will be omitted here.

The storage location information in the hash table resulting from calculation and solving collision is as follows (there is a padding value of 255 at a place where no keyword is filled):

{4, 0, 13, 255, 3, 255, 14, 7, 5, 8, 11, 10, 255, 255, 1, 9, 255, 255, 6, 2, 12, 255, 255}.

A construct of the keyword information (including the keywords and the keyword attributes) is as follows:

{"smil", SMIL_ELEMENT_SMIL},
{"head", SMIL_ELEMENT_HEAD},
{"meta", SMIL_ELEMENT_META},
{"layout", SMIL_ELEMENT_LAYOUT},
{"root-layout", SMIL_ELEMENT_ROOT_LAYOUT},
{"region", SMIL_ELEMENT_REGION},
{"body", SMIL_ELEMENT_BODY},
{"par", SMIL_ELEMENT_PAR},
{"text", SMIL_ELEMENT_TEXT},
{"img", SMIL_ELEMENT_IMG},
{"audio", SMIL_ELEMENT_AUDIO},
{"ref", SMIL_ELEMENT_REF},
{"video", SMIL_ELEMENT_VIDEO},
{"param", SMIL_ELEMENT_PARAM}.

As illustrated in FIG. 3, a method for searching for a keyword attribute according to an embodiment of the invention includes the following steps:

Step 301, determining a hash value of a first keyword to be searched for.

Step 302, determining corresponding storage location information according to the hash value.

Step 303, judging whether the first keyword is identical to a second keyword in a storage location corresponding to the storage location information, and if so, performing step 304; otherwise, performing step 305.

Step 304, taking a keyword attribute in the storage location as a keyword attribute of the first keyword and ending the flow.

Step 305, determining a step value corresponding to the first keyword and determining next piece of storage location information according to the step value.

Step 306, judging whether there is a padding value in a storage location corresponding to the next piece of storage location information, and if so, performing step 307; otherwise, returning to the step 303.

Step 307, determining the keyword to be unmatched and exiting the flow.

Particularly before the step 303, it can firstly be further judged whether there is a padding value in the storage location corresponding to the storage location information, and if so, then the flow is exited directly; otherwise, the step 303 is performed.

Taking a keyword "audio" as an example, to search for its keyword attribute, firstly its hash value is calculated according to the keyword to be 0x0E756469, and a remainder of dividing the hash value by the table length of 23 is used to obtain the location 19 in the table (Index=0x0E756469%23=19), but the keyword "meta" at the location 19 is not the keyword to be searched for; and the step value for "audio" is calculated to be 19, and the location 15 in Table 4 is obtained, but the keyword at this location is "img" and is not the keyword to be searched for either; and then the location 11 is derived by further adding the step value of 19, and at this time there is a keyword in match, and the attribute value of "audio" is derived as SMIL_ELEMENT_AUDIO=0x00.

With the normal sequential array matching method, the value corresponding to the keyword can be found only after character strings are matched for 11 times, while with the hast list, the value of the keyword can be found simply with three times at most, and the efficiency can be improved by 4 times. The matching efficiency will be further improved for a set of more keywords, e.g., the mime type or the like, in which there are approximately 200 character strings.

Based upon the same inventive idea, an embodiment of the invention further provides a device for parsing MMS information, and since the device addresses the problem under a similar principle to the method for parsing MMS information, for implementations of the device, reference can be made to the implementations of the method, and a repeated description thereof will be omitted.

Figure 4:
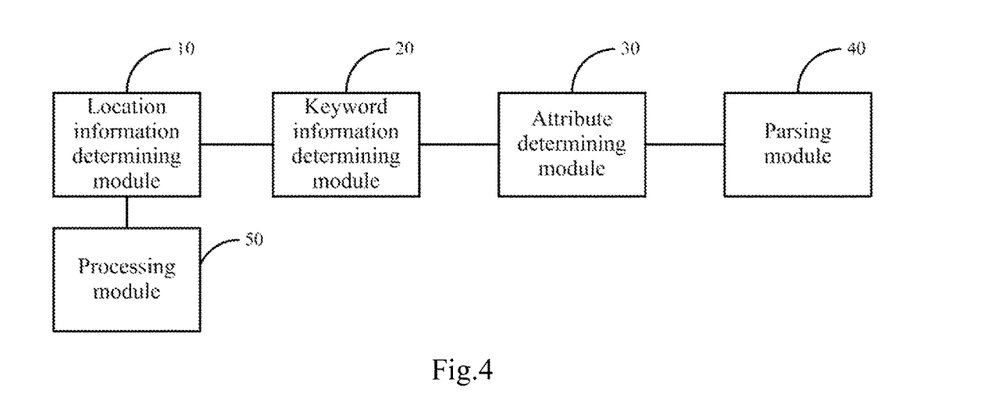
FIG. 4 is a schematic structural diagram of a device for parsing MMS information according to an embodiment of the invention.

As illustrated in FIG. 4, the device for parsing MMS information according to the embodiment of the invention includes a location information determining module 10, a keyword information determining module 20, an attribute determining module 30 and a parsing module 40.

The location information determining module 10 is configured to determine storage location information corresponding to a first keyword in received MMS information.

The keyword information determining module 20 is configured to determine keyword information in a storage location corresponding to the storage location information determined by the location information determining module 10.

The attribute determining module 30 is configured to take a keyword attribute in the keyword information determined by the keyword information determining module 20 as a keyword attribute corresponding to the first keyword when the first keyword is identical to a second keyword in the keyword information.

The parsing module 40 is configured to parse the MMS information according to the keyword attribute corresponding to the first keyword determined by the attribute determining module 30.

Preferably the device according to the embodiment of the invention can further include a processing module 50.

The processing module 50 is configured to determine storage location information corresponding to keyword information and to store the keyword information into storage locations corresponding to the storage location information before the location information determining module 10 determines the storage location information corresponding to the first keyword.

Preferably the processing module 50 determines, for a piece of keyword information, a hash value corresponding to the second keyword in the keyword information; determines corresponding storage location information according to the hash value; and judges whether the determined storage location information is identical to already determined storage location information of other keyword information, and if so, then it determines a piece of new storage location information and returns to the step of judging whether the determined storage location information is identical to already determined storage location information of other keyword information; otherwise, it takes the determined storage location information as storage location information corresponding to the keyword information.

Preferably the processing module 50 determines hash values corresponding to second keywords in all of the keyword information; determines corresponding storage location information according to each hash value respectively; and judges whether there is identical storage location information among all of the storage location information, and if so, it determines keyword information corresponding to each piece of storage location information among the identical storage location information, reserves the storage location information corresponding to one piece of the keyword information, determines newly storage location information corresponding respectively to each piece of remaining keyword information and returns to the step of judging whether there is identical storage location information among all of the storage location information; otherwise, it takes the determined storage location information as storage location information corresponding to the keyword information.

Preferably the processing module 50 determines newly storage location information by adding a step value to the determined storage location information to obtain new storage location information.

Preferably the processing module 50 stores the keyword information in the form of a hash table.

Preferably the processing module 50 puts a padding value into a location in the hash table where no keyword information is filled after filling all of the keyword information into the hash table before the location information determining module determines the storage location information corresponding to the first keyword.

Preferably the attribute determining module 30 determines a step value corresponding to the first keyword when the first keyword is different from a second keyword in the determined keyword information and the determined keyword information is not a padding value; adds the step value to the determined storage location information to obtain new storage location information and returns to the step of determining keyword information in a storage location corresponding to the storage location information; and determines the first keyword to be unmatched when the determined keyword information is a padding value.

Preferably the attribute determining module 30 and the processing module 50 can determine the step value in Formula 2.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A method of parsing Multimedia Message Service, MMS, information, comprising executing on an intelligent terminal the steps of:
   receiving the MMS information via network;
   determining storage location information corresponding to a first keyword in received MMS information according to a preset relationship between a keyword and a storage location information;
   determining keyword information in a storage location corresponding to determined storage location information, wherein the keyword information comprises a second keyword and a keyword attribute;
   taking a keyword attribute in the keyword information as the keyword attribute corresponding to the first keyword when the first keyword is identical to a second keyword in the determined keyword information; and
   parsing the MMS information according to the keyword attribute corresponding to the first keyword
   wherein before determining the storage location information corresponding to the first keyword;
   storing the keyword information in the form of a hash table; and
   putting a padding value into a location in the hash table where no keyword information is filled after filling all of the keyword information into the hash table; and
   wherein after determining the keyword information in the storage location corresponding to the storage location information;
   when the first keyword is different from a second keyword in the determined keyword information and the determined keyword information is not a padding value, determining a step value corresponding to the first keyword; adding the step value to the determined storage location information to obtain new storage location information and returning to the step of determining keyword information in a storage location corresponding to the storage location information; and
   determining the first keyword to be unmatched when the determined keyword information is a padding value.

2. The method according to claim 1, wherein before determining the storage location information corresponding to the first keyword, the method further comprises:
   determining storage location information corresponding to keyword information and storing the keyword information into storage locations corresponding to the storage location information.

3. The method according to claim 2, wherein determining the storage location information corresponding to the keyword information comprises:
   determining, for a piece of keyword information, a hash value corresponding to a second keyword in the keyword information;
   determining corresponding storage location information according to the hash value; and
   judging whether the determined storage location information is identical to already determined storage location information of other keyword information, and if so, then determining a piece of new storage location information and returning to the step of judging whether the determined storage location information is identical to already determined storage location information of other keyword information; otherwise, taking the determined storage location information as storage location information corresponding to the keyword information.

4. The method according to claim 2, wherein determining the storage location information corresponding to the keyword information comprises:
   determining hash values corresponding to second keywords in all of keyword information;
   determining corresponding storage location information according to each of the hash values respectively; and
   judging whether there is identical storage location information among all of the storage location information, and if so, then determining keyword information corresponding to each piece of storage location information among the identical storage location information, reserving the storage location information corresponding to one piece of keyword information, determining newly storage location information corresponding respectively to each piece of remaining keyword information, and returning to the step of judging whether there is identical storage location information among all of the storage location information; otherwise, taking the determined storage location information as storage location information corresponding to the keyword information.

5. The method according to claim 3, wherein determining newly the storage location information comprises:
   adding a step value to the determined storage location information to obtain new storage location information.

6. The method according to claim 1, wherein the step value is determined in the formula of:

$$\text{Step}=1+(h \% (\text{hash\_table\_size}-2));$$

wherein Step represents the step value, h represents the hash value calculated corresponding to the second keyword, and hash_table_size represents a table length of the hash table.

7. A device for parsing Multimedia Message Service, MMS, information, applied in an intelligent terminal, comprising a processor, wherein the processor is configured:
   to receiving the MMS information via network;
   to determine storage location information corresponding to a first keyword in received MMS information according to a preset relationship between a keyword and a storage location information;
   to determine keyword information in a storage location corresponding to determined storage location information, wherein the keyword information comprises a second keyword and a keyword attribute;
   to take a keyword attribute in the keyword information as the keyword attribute corresponding to the first keyword when the first keyword is identical to a second keyword in the determined keyword information; and
   to parse the MMS information according to the keyword attribute corresponding to the first keyword;
   wherein the device further comprises a storage configured to store the keyword information in the form of a hash table; and
   before determining the storage location information corresponding to the first keyword, the processor is further configured to put a padding value into a location in the hash table where no keyword information is filled after filling all of the keyword information into the hash table before determining the storage location information corresponding to the first keyword; and
   after determining the keyword information in the storage location corresponding to the storage location information, the processor is further configured to determine a step value corresponding to the first keyword when the first keyword is different from a second keyword in the determined keyword information and the determined keyword information is not a padding value; to add the step value to the determined storage location information to obtain new storage location information and to return to the step of determining keyword information in a storage location corresponding to the storage location information; and to determine the first keyword to be unmatched when the determined keyword information is a padding value.

8. The device according to claim 7, wherein the processor is further configured:
   to determine storage location information corresponding to keyword information and to store the keyword information into storage locations corresponding to the storage location information before determining the storage location information corresponding to the first keyword.

9. The device according to claim 8, wherein the processor is specifically configured:
   to determine, for a piece of keyword information, a hash value corresponding to a second keyword in the keyword information; to determine corresponding storage location information according to the hash value; and to judge whether the determined storage location information is identical to already determined storage location information of other keyword information, and if so, to determine a piece of new storage location information and to return to the step of judging whether the determined storage location information is identical to already determined storage location information of other keyword information; otherwise, to take the determined storage location information as storage location information corresponding to the keyword information.

10. The device according to claim 8, wherein the processor is specifically configured:
   to determine hash values corresponding to second keywords in all of keyword information; to determine corresponding storage location information according to each of the hash values respectively; and to judge whether there is identical storage location information among all of the storage location information, and if so, to determine keyword information corresponding to each piece of storage location information among the identical storage location information, to reserve the storage location information corresponding to one piece of keyword information, to determine newly storage location information corresponding respectively to each piece of remaining keyword information, and to return to the step of judging whether there is identical storage location information among all of the storage location information; otherwise, to take the determined storage location information as storage location information corresponding to the keyword information.

11. The device according to claim 9, wherein the processor is specifically configured:
to add a step value to the determined storage location information to obtain new storage location information.

12. The device according to claim 7, wherein the step value is determined in the formula of:

$$Step = 1 + (h \% (hash\_table\_size - 2));$$

wherein Step represents the step value, h represents the hash value calculated corresponding to the second keyword, and hash_table_size represents a table length of the hash table.

13. The device according to claim 7, wherein the device is a mobile phone.

14. The device according to claim 7, wherein the device is a tablet computer.

\* \* \* \* \*